Feb. 28, 1950
O. C. FROM
2,498,669
IMPULSE TRANSMITTER TEST INSTRUMENT
Filed Sept. 29, 1944
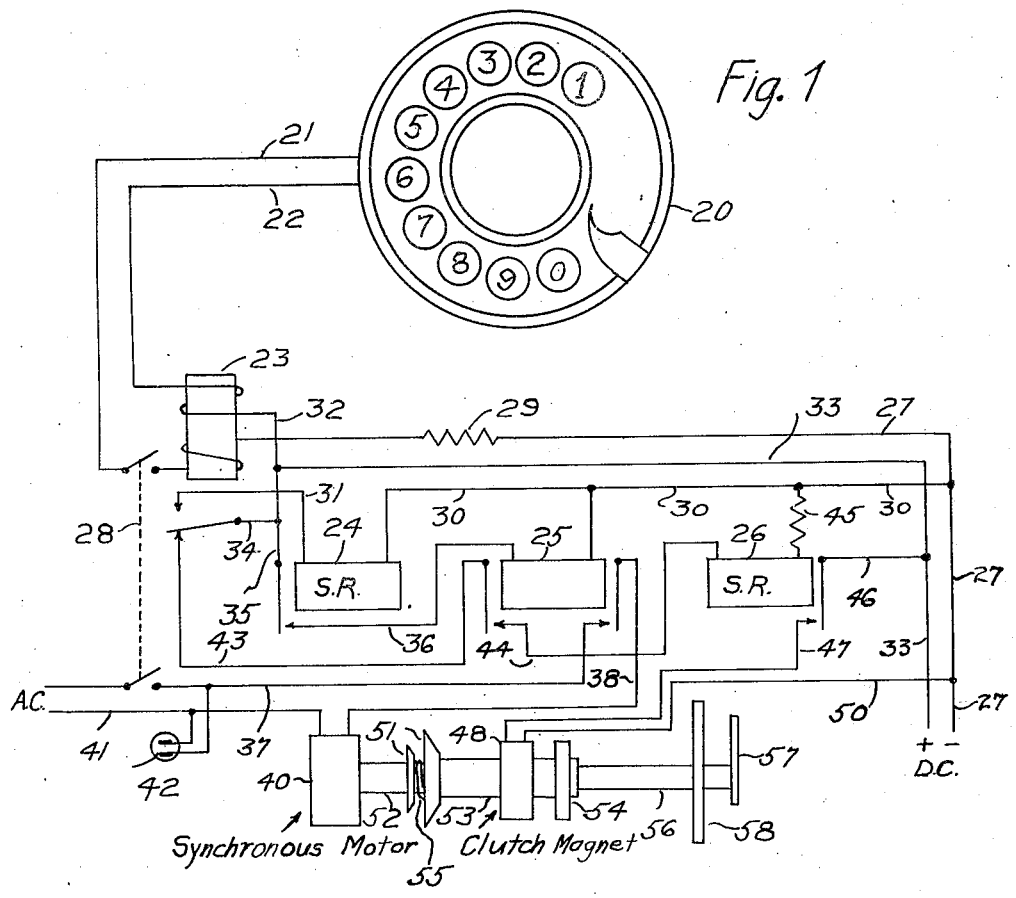
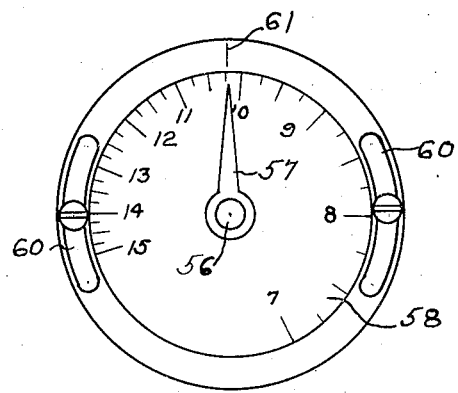
INVENTOR.
Owen C. From
BY
AGENT.

Patented Feb. 28, 1950

2,498,669

UNITED STATES PATENT OFFICE 2,498,669

IMPULSE TRANSMITTER TEST INSTRUMENT

Owen C. From, East Orange, N. J., assignor to Federal Telephone & Radio Corporation, New York, N. Y., a corporation of Delaware Application September 29, 1944, Serial No. 556,400

12 Claims. (Cl. 179—175.2)

The present invention relates to an instrument for testing impulse transmitters such as automatic telephone dials and particularly for testing and adjusting the impulse speed of such dials.

As is well known, automatic telephone dials must be adjusted to give a definite number of impulses per second in order to properly operate the equipment which they control. I have invented a very simple apparatus for testing such instruments in which the reading of the adjusted rate is taken directly from an indicator.

My invention further provides a minimum of equipment for performing the test and utilizes an extremely simple timing device.

It is an object of my invention to provide an automatic telephone dial test instrument which will indicate the rate of the telephone dial directly in impulses per second.

It is another object of my invention to provide a testing instrument which shall be economical to manufacture and readily used even by the unskilled worker.

A further object of my invention is to provide such an instrument which is capable of indicating the departure of an actual dial speed from a speed adopted as standard.

A still further object of the invention is to provide such a pulse rate testing instrument which utilizes as a time comparison device a synchronous motor of the type normally used for clock drive which is very accurate in its timing operation.

Other objects and features of my invention will be apparent when the following description is considered in connection with the annexed drawings, in which—

Figure 1 is a schematic view of the circuit of the dial tester, and

Figure 2 is a front elevational view of the indicating dial of the test instrument.

Referring now to Figure 1, there is shown therein the telephone dial 20 of the usual form which instrument may be supported in any suitable manner or may be held in the hand. The dial is connected to the test instrument by connecting the leads 21 and 22 to the dial terminals.

The testing instrument comprises a pulse circuit consisting of the relays 23, 24, 25 and 26 together with a synchronous clock motor and a fast acting magnetic clutch for connecting the indicator to the motor as will be described hereinafter. The source of direct current, as indicated in the drawing, is connected by means of conductor 27 and resistance 29 to one winding of relay 23, thence over conductor 21 to the telephone dial returning over conductor 22 and through the second winding of relay 23 and conductors 32 and 33 to the other pole of the direct current source. Interposed in lead 21, as may be seen in the drawing, is one blade of a double pole single throw switch 28 which switch is utilized to close the circuit through relay 23 as is obvious from the drawing.

The armature of relay 23 lies normally on its back contact but is operated to its front contact when its circuit is completed through the winding of the relay. Upon such completion a circuit is formed which leads from the positive side of the direct current source over conductors 33 and 34 through the armature and front contact of the relay 23, thence over conductor 31 to slow-to-release relay 24 and thence over conductors 30 and 27 to the negative pole of the D. C. source.

Each impulse sent out by the dial is effective to operate relay 23, but relay 24 being slow-to-release restores to its normal position only when the circuit is open for a sufficient interval to permit the relay to release. Upon operation of relay 24 a circuit is completed from the positive side of the D. C. source over conductors 33 and 35, the armature and contact of relay 24, conductor 36, the winding of relay 25, and conductors 30 and 27 to the negative side of the D. C. source. This operation causes energization of relay 25 and closure of a circuit leading from the A. C. source over the other blade of switch 28, conductor 37, armature and front contact of relay 25, conductor 38, synchronous motor 40 and conductor 41 to the opposite pole of the A. C. source. The motor 40 is a standard clock timer motor of great accuracy.

The operation of relay 25 is thus effective to close the circuit to the synchronous motor 40 and permit it to reach its synchronous speed which speed can be whatever may be desirable but in the present instance is one revolution per second. It is to be noticed that a neon lamp 42 is connected across the conductors 37 and 41 and serves as a pilot light to show when the A. C. current is flowing.

Upon the occurrence of the first open interval during the rotation of the dial 20 back towards its normal position the armature of relay 23 is released and makes contact with its back contact, thereby completing a circuit leading over conductors 33 and 34, armature and back contact of relay 23, conductor 43, armature and front contact of relay 25, conductor 44, winding of slow-to-release relay 26 and resistance 45 and conductors 30 and 27 to the negative side of the D. C. source. This causes operation of relay 26 and completion of a circuit leading from the positive side of the D. C. source over conductors 33 and 46, armature and contact of that relay, conductor 47, the winding 48 of the electro-magnetic clutch and conductors 50 and 27 to the negative side of the D. C. source. While the electro-magnetic clutch may be of any form, it has been shown in the drawing as comprising the clutch elements 51, one of which is fixed to the motor shaft 52 and the other to a sleeve 53 slidable upon said shaft. At its other end the sleeve 53 carries a plate 54 which is attracted by the magnet 48 whenever that magnet is energized, thereby causing the two clutch elements 51 to be brought into engagement against the tension of the spring 55. At this time, the shaft extension 56 will be driven by the motor 40 and the indicator hand or pointer 57 will rotate with respect to the stationary dial member 58.

The slow-to-release relay 26 is adjusted so that it will hold between pulses occurring at the rate of seven per second. For a dial with an impulse ratio (the ratio of the break period to the total impulse period) of two to three the period between pulses at the rate of seven pulses per second will be approximately 0.0476 second. Obviously, as the speed of the dial is increased the period between pulses is decreased proportionately, but the holding time of relay 26 remains constant and consequently the amount of the overthrow which will result must be corrected. Such a correction is provided for by the unequal graduation of the dial 58 as indicated in Figure 2.

If relay 26 is adjusted to hold for a period longer than is required for seven pulses per second the timer will overthrow the amount of the additional time at all speeds. This error may be corrected in either one of two ways (1) by adjusting the relay 26 to release more rapidly, or (2) by shifting the face of the timer dial 58 in a clockwise direction, such shifting of the timer dial being possible since the timer dial is mounted by means of screws extending through elongated slots, as 60 (Fig. 2).

From the above it will be clear that in operation the dial under test is connected to leads 21 and 22 and the switch 28 closed (if this switch is utilized) after which zero is dialed. The closure of switch 28 will cause operation of relays 23, 24, 25 and will start the synchronous motor 40 due to the operation of the circuits in the manner heretofore described. As the dial rotates in a counter-clockwise direction from its zero position the first open interval will cause the deenergization of relay 23 and consequently the energization of relay 26. Operation of this relay causes energization of clutch magnet 48 and connection of pointer 57 to motor shaft 56 for rotation therewith.

At the termination of the rotation of the dial in a counter-clockwise direction the circuit through relay 23 will be closed for a sufficient interval to permit the deenergization of relay 26, this occuring after the dial comes to rest, by an interval depending upon the releasing time of relay 26 as hereinabove described. Since the dial 58 is graduated as mentioned above, and since zero is always dialed, it will be clear that the position of the hand will give a direct reading of the number of pulses per second emitted by telephone dial 20. Thus the pointer operates at the rate of one revolution per second, and since dialing zero transmits ten pulses, one revolution of the pointer represents ten pulses per second (correction being made for the holding time of relay 26 by setting the timer dial a corresponding amount counterclockwise from the "ten" graduation). Now, if the pointer rotates less than one revolution, it will indicate a greater number of pulses per second than ten, whereas if the pointer makes more than one revolution a lesser number of pulses than ten will be indicated, as is clear from an inspection of the timer dial of Figure 2. There can be no misreading of the pointer since the range of speed of such impulse transmitters is limited.

Means are provided, though not shown, for resetting the pointer 57 to its zero position. Such means may comprise a resetting knob frictionally connected at will to the pointer shaft 56.

Due to the arrangement of the test instrument as hereinabove described it is possible to calibrate the instrument by means of its own operation. If this be desirable it is necessary only to set the dial to operate at ten pulses per second as indicated by the test instrument, and to then dial five pulses twice without restoring the pointer to normal position in the intervening interval. The second five pulses should overthrow the mark for ten pulses an amount equal to that between normal (as indicated by the mark 61 on the dial) and ten. If the amount of overthrow is more than that mentioned, the scale should then be shifted clockwise an amount equal to approximately ½ of the overthrow. The telephone dial is again adjusted to read ten impulses per second on the timer dial and again five impulses are twice dialed. This operation is repeated until the overthrow beyond the graduation when five is twice dialed is approximately equal to the overthrow beyond the starting point when zero is dialed.

While I have described a particular form of my invention and a particular synchronous motor and electro-magnetic clutch arrangement for use therewith, it is to be understood that other forms of my invention may be constructed and therefore I wish to be limited not by the foregoing disclosure but solely by the appended claims.

What is claimed is:

1. In a pulse rate tester for an impulse transmitter, in combination, a relay in circuit with the contacts of the impulse transmitter, a slow-to-release relay operated by said first mentioned relay, a time comparison device comprising a synchronous motor under control of said slow-to-release relay, a second slow-to-release relay operated upon the breaking of the circuit to said first mentioned relay as the transmitter emits its impulses, an electro-magnetic clutch controlled by said second slow-to-release relay, a stationary graduated timer dial and pointer movable with respect to the graduations of said dial and adapted to be connected to said synchronous motor for rotation therewith upon operation of said electromagnetic clutch, said pointer being disengaged from said synchronous motor upon release of said second slow-to-release relay, said release occurring a definite time interval after the transmitter has completed transmission of a series of pulses, said timer dial being graduated in unequal divisions, whereby the number of pulses per second emitted by the transmitter may be directly read.

2. In a pulse rate tester for an automatic impulse transmitter, in combination, a pulse relay operated in accordance with the pulses emitted by the impulse transmitter, a slow-to-release relay operated by said pulse relay and adjusted to have a releasing time at least equal to the interval of operation of said pulse relay during release of said pulse relay when the impulse transmitter is adjusted to emit the minimum number of pulses per second within its range, a synchronous motor, and an indicator adapted to be connected to said synchronous motor for operation thereby during the period of operation of said slow-to-release relay, said indicator being driven by said motor through a predetermined angular distance when the impulse transmitter is operated to emit the maximum number of impulses and is adjusted to emit impulses at a standard rate, said instrument indicating means being graduated in unequal divisions, the angular interval from the starting point to any graduation being proportional to the time required for the impulse transmitter to emit the maximum number of impulses at the rate represented by the particular graduation added to the releasing time of the said slow-to-release relay.

3. In a pulse rate tester for an automatic impulse transmitter adjustable to emit from 7 to 15 pulses per second, in combination, a pulse relay operated in accordance with the pulses emitted by the transmitter, a slow-to-release relay operated by said pulse relay and having a releasing time at least equal to the interval of energization of said pulse relay as determined by the interval of closed condition of the transmitter contacts when the transmitter is adjusted to emit 7 pulses per second, a synchronous motor, and an indicator adapted to be connected to said synchronous motor for operation thereby during the period of operation of said slow-to-release relay, said indicator being driven by said motor through a predetermined angular distance when said transmitter is operated to emit 10 pulses and is adjusted to emit pulses at the rate of 10 per second, said instrument indicating means being graduated in unequal divisions, the interval from the starting point to any graduation being proportional to the time required for the transmitter to emit 10 pulses at the rate represented by the graduation added to the time required for release of the slow-to-release relay.

4. In a pulse rate tester for an automatic impulse transmitter, in combination, a pulse relay operated in accordance with the pulses emitted by the transmitter, a slow-to-release relay operated by said pulse relay and adjusted to have a releasing time at least equal to the interval of energization of said pulse relay as determined by the interval of closed condition of the transmitter contacts when the transmitter is adjusted to emit the minimum number of pulses per second within its range, a synchronous motor, means operated by said pulse relay to energize said synchronous motor upon the first opening of the contacts of the transmitter, an indicator, means for connecting said indicator to said synchronous motor for operation thereby during the period of operation of said slow-to-release relay, said indicator being driven by said motor through a single revolution when the transmitter is operated to emit the maximum number of impulses and is adjusted to emit impulses at a standard rate, said instrument indicating means being graduated in unequal divisions, the interval from the starting point to any graduation being proportional to the time required for the transmitter to emit the maximum number of impulses at the rate represented by the particular graduation added to the releasing time of the said slow-to-release relay.

5. In a pulse rate tester for an automatic telephone dial adjustable to emit from 7 to 15 pulses per second, in combination, a pulse relay operated in accordance with the pulses emitted by the telephone dial, a slow-to-release relay operated by said pulse relay and having a releasing time at least equal to the interval of energization of said pulse relay as determined by the interval of closed condition of said telephone dial contacts when the telephone dial is adjusted to emit 7 pulses per second, a synchronous motor, means operated by said pulse relay to energize said synchronous motor upon the first opening of the contacts of the telephone dial, an indicator, means for connecting said indicator to said synchronous motor for operation thereby during the period of operation of said slow-to-release relay, said indicator being driven by said motor through a single revolution when the telephone dial is operated to emit 10 pulses and is adjusted to emit pulses at the rate of 10 per second, said instrument indicating means being graduated in unequal divisions, the interval from the starting point to any graduation being proportional to the time required for the telephone dial to emit 10 pulses at the rate represented by the graduation added to the release time required of the slow-to-release relay.

6. In a pulse rate tester for an automatic telephone dial, in combination, a pulse relay operated in accordance with the pulses emitted by the telephone dial, a slow-to-release relay operated by said pulse relay and adjusted to have a releasing time at least equal to the interval of energization of said pulse relay as determined by the interval of closed condition of the telephone dial contacts when the telephone dial is adjusted to emit the minimum number of pulses per second within its range, a synchronous motor, an indicator, adapted to be connected to said synchronous motor for operation thereby during the period of operation of said slow-to-release relay, said indicator being driven by said motor through a single revolution when the telephone dial is operated to emit the maximum number of impulses and is adjusted to emit impulses at a standard rate, said instrument indicating means being graduated in unequal divisions, the interval from the starting point to any graduation being proportional to the time required for the telephone dial to emit the maximum number of impulses at the rate represented by the particular graduation added to the releasing time of the said slow-to-release relay.

7. In a pulse rate tester for an automatic telephone dial, in combination, a time comparison device comprising a synchronous motor, a pulse circuit connectable to the telephone dial, means operable upon connection of said pulse circuit to said dial to cause energization of said synchronous motor, indicating means mechanically connectable to said synchronous motor for operation therewith, means operable upon the first opening of the contacts of the telephone dial as the dial restores to normal position for connecting said indicating means to said synchronous motor, and means operable upon restoration of the telephone dial to normal position for disconnecting said indicating means from said synchronous motor whereby said indicating means are connected to said motor only during the pulse emitting operation of the telephone dial and a reading of the pulses per second emitted therefrom is obtained.

8. In a pulse rate tester for an automatic telephone dial, in combination, a pulse relay operated in accordance with the pulses emitted by the telephone dial, a slow-to-release relay operated by said pulse relay and adjusted to have a releasing time at least equal to the interval of operation of said pulse relay when the telephone dial is adjusted to emit the minimum number of pulses per second within its range, a time comparison device comprising a synchronous motor, and an indicator adapted to be connected to said synchronous motor for operation thereby during the period of operation of said slow-to-release relay, said indicator being driven by said synchronous motor through a predetermined angular distance when the telephone dial is operated to emit the maximum number of impulses and is adjusted to emit impulses at a standard rate, said indicating means being graduated in angular divisions, the angular interval from the starting point to any graduation being proportional to the time required for the telephone dial to emit the maximum number of impulses at the rate represented by the particular graduation added to the releasing time of the said slow-to-release relay.

9. In a pulse rate tester for a keying device which transmits a train of counting pulses, relay means operable in response to the first circuit break in said train and differently operable at the end of the last circuit break in said train to define the starting and ending moments respectively of the time interval which measures the duration of said pulse train, said relay means including a slow-to-release relay the holding time of which is commensurate with said time interval, a pointer and dial for indicating the duration of said time interval, a synchronous motor arranged for mechanical coupling to said pointer, an electromagnetically operated clutch for effecting said mechanical coupling, and a circuit the closing and opening of which is controlled by said slow-to-release relay for operating said clutch.

10. In a pulse rate tester for an automatic telephone dial, in combination, an impulse transmitter, a pulse relay controllable by said transmitter and responsive to the pulses thereof, a relay means connected to said pulse relay and adapted to be operated by said pulse relay and to remain in operative condition during a predetermined series of operations of said pulse relay, a timing device, controllable by said relay means, comprising a constant speed motor adapted to be energized by said relay means, a rotatable member, a slow-release relay connected to said relay means, a clutch controllable by said slow-release relay for connecting said member to said motor for rotation therewith upon operation of said clutch, and graduated means stationary with respect to the rotating member whereby the number of pulses per second emitted by the transmitter may be read directly.

11. In a pulse rate tester for an automatic telephone dial the combination according to claim 11, in which the position of stationary means may be adjusted to compensate for the operation of the slow release relay.

12. In a pulse rate tester for an automatic telephone dial, the combination according to claim 11, in which the relay means comprises a slow release relay and a second relay controllable thereby.

OWEN C. FROM.

REFERENCES CITED

The following references are of record in the file of this patent:

UNITED STATES PATENTS

| Number | Name | Date |
|---|---|---|
| 1,543,813 | Atwood | June 30, 1925 |
| 1,621,480 | Ewing | Mar. 15, 1927 |
| 1,693,725 | Nelson | Dec. 4, 1928 |
| 2,207,513 | Hadfield | July 9, 1940 |
| 2,245,683 | Kessler | June 17, 1941 |
| 2,248,923 | Hanley | July 15, 1941 |